United States Patent [19]

Beheler

[11] Patent Number: 5,867,145
[45] Date of Patent: Feb. 2, 1999

[54] GRAPHICAL IMAGE RECASTING

[75] Inventor: Carlan Joseph Beheler, Foster City, Calif.

[73] Assignee: Sun Microsystems, Inc., Palo Alto, Calif.

[21] Appl. No.: 674,510

[22] Filed: Jul. 1, 1996

[51] Int. Cl.$^6$ .................................................. G09G 5/04
[52] U.S. Cl. ........................ 345/153; 345/155; 382/162
[58] Field of Search .................................. 345/153, 155; 382/162

[56] References Cited

U.S. PATENT DOCUMENTS

| | | | |
|---|---|---|---|
| 4,135,240 | 1/1979 | Ritchie | 340/172.5 |
| 4,141,005 | 2/1979 | Bonner et al. | 340/347 |
| 4,821,208 | 4/1989 | Ryan et al. | 364/518 |
| 5,068,644 | 11/1991 | Batson et al. | 340/701 |
| 5,241,658 | 8/1993 | Masterson et al. | 395/162 |
| 5,469,190 | 11/1995 | Masterson | 345/155 |
| 5,537,579 | 7/1996 | Hiroyuki | 395/500 |
| 5,583,500 | 12/1996 | Allen et al. | 341/107 |

FOREIGN PATENT DOCUMENTS

WO 94/27211  11/1994  European Pat. Off. .......... G06F 7/00

*Primary Examiner*—Amare Mengistu
*Assistant Examiner*—Ricardo Osorio
*Attorney, Agent, or Firm*—James D. Ivey

[57] ABSTRACT

A merge computer instruction is capable of interleaving respective bytes of two four-byte words and is used once to group most significant bytes and least significant bytes of first and second pixel components represented in a two-byte format and to group most significant bytes and least significant bytes of third and fourth pixel components represented in the two-byte format and a second time to group the most significant bytes of the first, second, third, and fourth pixel components and to group the least significant bytes of the first, second, third, and fourth pixel components. The least significant bytes of the first, second, third, and fourth pixel components represent the first, second, third, and fourth pixel components in a one-byte format and are stored as the respective pixel components in the one-byte format. Thus, four pixel components are converted from a two-byte format to a one-byte format using only two computer instructions. Eight contiguous bytes can be accessed in a single read computer instruction or a single write computer instruction. Accordingly, two read computer instructions retrieve eight pixel components in a two-byte format. The eight pixel components are converted to a one-byte format using four merge computer instructions and are stored in memory using a single write computer instruction. Accordingly, a four-band graphical image which includes one million pixels can be converted from a two-byte processing format to a one-byte display format using one million read computer instructions, one-half million merge computer instructions, and one-half million write computer instructions.

5 Claims, 5 Drawing Sheets

GRAPHICAL IMAGE RECASTING

SPECIFICATION

FIELD OF THE INVENTION

The present invention relates to graphical image processing in a computer system and, in particular, to a particularly efficient mechanism for recasting pixels of a graphical image which are represented in a 16-bit format into pixels represented in an 8-bit format.

BACKGROUND OF THE INVENTION

In many computer graphics systems in use today, individual picture elements, i.e., pixels, of a graphical image are stored in a particular format. For example, single-band greyscale pixels are commonly stored as unsigned eight-bit integers, and 4-band color pixels are commonly stored as four contiguous unsigned eight-bit integers. Graphical images, which are generated using data representing a model and a computer process such as a three-dimensional modeling system, frequently involve complex numerical calculations. It is common for a graphical image to be rendered while pixels of the graphical image are represented in a format which provides greater precision that the particular format in which displayed pixels are stored. For example, in a computer graphics system in which each band of a displayed pixel is stored as an eight-bit unsigned integer, each band of a pixel is frequently stored as a sixteen-bit unsigned integer during processing and is converted to an eight-bit unsigned integer substantially immediately prior to display of the pixel. Such format conversion of each band of a pixel is generally referred to as recasting the pixel.

Recasting conventionally requires (i) loading from the memory of a computer a single pixel or a single band of a pixel at a time, (ii) converting the pixel or the band of the pixel to a display format, and (iii) storing the converted pixel of band of a pixel. Graphical images commonly have approximately one thousand rows and approximately one thousand columns of pixels, i.e., approximately one million pixels, and color graphical images typically include four bands per pixel. Therefore, recasting by such conventional techniques typically involves approximately four million load operations and approximately four million store operations. In addition, the recasting of a pixel or a band of a pixel typically requires at least one computer instruction per pixel or per band of each pixel. Therefore, approximately another four million computer instructions are required to recasting each band of each pixel of a typical graphical image.

Processing of graphical images typically requires substantial processing resources. Requiring substantial processing resources to recast the pixels of a graphical image into a display format only adds to the processing resources required to render and display a graphical image. Because of the substantial computer system resources required for such graphical image recasting, a need persists in the industry for ever increasing efficiency in recasting of pixels or bands of pixels of graphical images from a high-precision processing format to a space-efficient display format.

SUMMARY OF THE INVENTION

In accordance with the present invention, data components in a first, processing format, each of which includes a selected portion which represents the data component in a second, display format, are merged to form an interleaved data word in which the selected portions of data components are grouped. For example, two pixel components, which are represented in a two-byte format in which the least significant byte represents each pixel component in a one-byte format, are merged to form a four-byte interleaved word in which the first two bytes are the most significant bytes of the pixel components in the two-byte format and in which the next two bytes are the least significant bytes of the pixel components in the two-byte format. Since the least significant bytes of the pixel components in the two-byte format are equivalent to the two pixel components represented in the one-byte format, the two pixel components are effectively converted to a two-byte word in which each pixel component is represented in the one-byte format.

Further in accordance with the present invention, a merge computer instruction is capable of interleaving respective bytes of two four-byte words and is used once to group most significant bytes and least significant bytes of first and second pixel components represented in a two-byte format and to group most significant bytes and least significant bytes of third and fourth pixel components represented in the two-byte format and a second time to group the most significant bytes of the first, second, third, and fourth pixel components and to group the least significant bytes of the first, second, third, and fourth pixel components. The least significant bytes of the first, second, third, and fourth pixel components represent the first, second, third, and fourth pixel components in a one-byte format and are stored as the respective pixel components in the one-byte format. Thus, four pixel components are converted from a two-byte format to a one-byte format using only two computer instructions.

Further in accordance with the present invention, eight contiguous bytes can be accessed in a single read computer instruction or a single write computer instruction. Accordingly, two read computer instructions retrieve eight pixel components each of which are represented in a two-byte format. The eight pixel components are converted to a one-byte format using four merge computer instructions and are stored in memory using a single eight-byte write computer instruction. Accordingly, a four-band graphical image which includes one million pixels can be converted from a two-byte processing format to a one-byte display format using one million read computer instructions, one-half million merge computer instructions, and one-half million write computer instructions. Each write computer instruction can require an additional move computer instruction to form eight contiguous bytes-of pixel data in an appropriate form for storage. The present invention therefore represents a significant improvement of conventional techniques.

DETAILED DESCRIPTION

Figure 1:
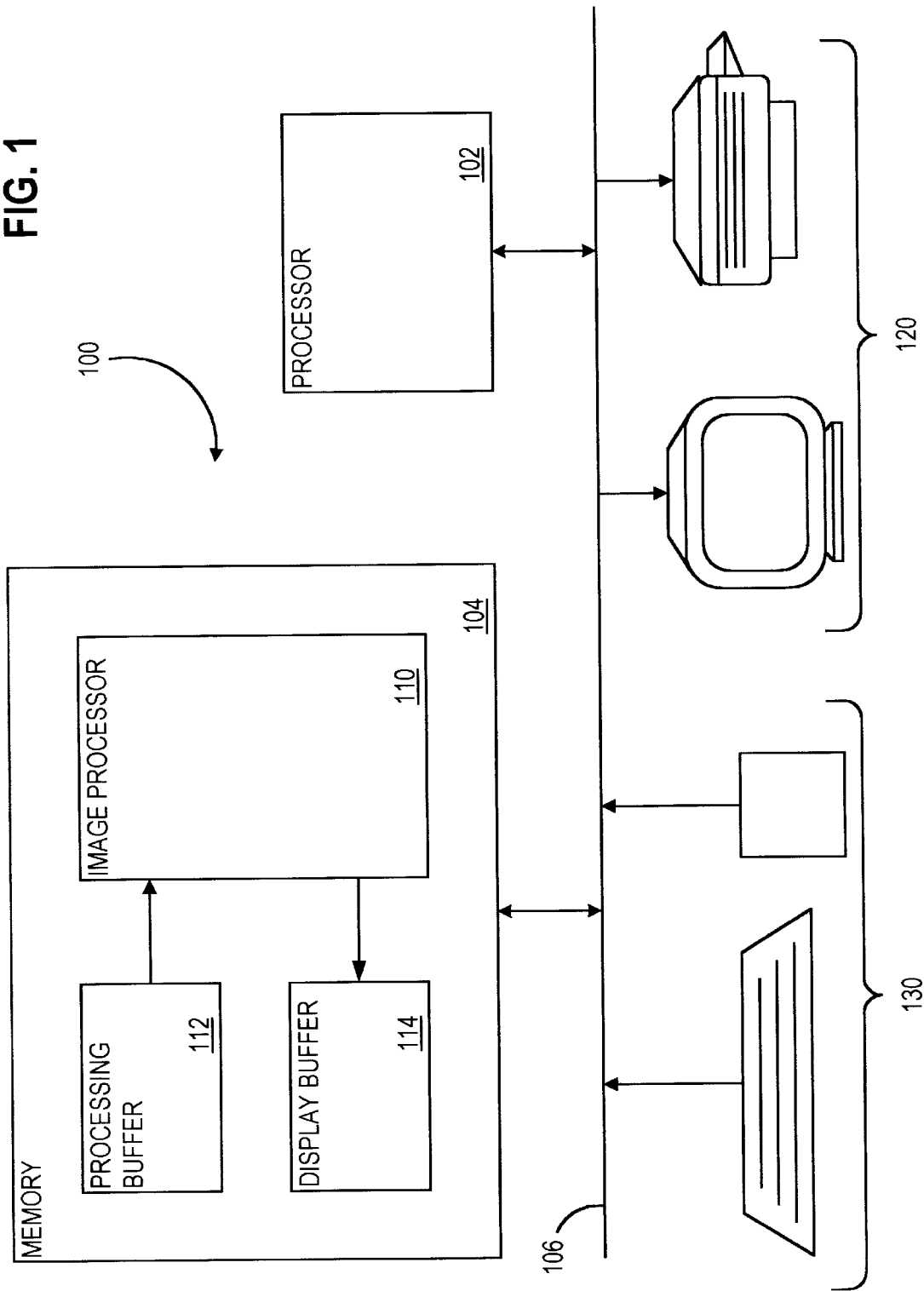
FIG. 1 is a block diagram of a computer system which includes an image processor which recasts graphical image data in accordance with the present invention.

In accordance with the present invention, a merge computer instruction is used to combine selected portions of multiple pixel data components of a first data format wherein each selected portion represents the pixel data component in a second data format. For example, two pixel components, which are represented in a two-byte format in which the least significant byte represents each pixel component in a one-byte format, are merged to form a four-byte interleaved word in which the first two bytes are the most significant bytes of the pixel components in the two-byte format and in which the next two bytes are the least significant bytes of the pixel components in the two-byte format. Since the least significant bytes of the pixel components in the two-byte format are equivalent to the two pixel components represented in the one-byte format, the two pixel components are effectively converted to a two-byte word in which each pixel component is represented in the one-byte format.

Hardware Components of the Image Processing System

To facilitate appreciation of the present invention, the hardware components of the recasting system are briefly described. Computer system 100 (FIG. 1) includes a processor 102 and memory 104 which is coupled to processor 102 through a bus 106. Processor 102 fetches from memory 104 computer instructions and executes the fetched computer instructions. Processor 102 also reads data from and writes data to memory 104 and sends data and control signals through bus 106 to one or more computer display devices 120 in accordance with fetched and executed computer instructions. Processor 102 is described in greater detail below.

Memory 104 can include any type of computer memory and can include, without limitation, randomly accessible memory (RAM), read-only memory (ROM), and storage devices which include storage media such as magnetic and/or optical disks. Memory 104 includes an image processor 110, which is a computer process executing within processor 102 from memory 104. A computer process is a collection of computer instructions and data which collectively define a task performed by computer system 100. As described more completely below, image processor 110 (i) reads pixels in a processing format from processing buffer 112, (ii) recasts the pixels in the processing format to pixels in a display format, and (iii) stores the pixels in the display format in display buffer 114.

Processing buffer 112 and display buffer 114 are stored in memory 104. Processing buffer 112 stores data representing pixels of a graphical image in a processing format. In one embodiment, the processing format includes a sixteen-bit unsigned integer to represent each band of each pixel. For example, if the graphical image represented by processing buffer 112 is a single-band greyscale graphical image, each pixel of the graphical image is represented by a single sixteen-bit unsigned integer. Similarly, if the graphical image represented by processing buffer 112 is a four-band color graphical image whose bands are alpha, blue, green, and red, each pixel of the graphical image is represented by four contiguous sixteen-bit unsigned integers which represent alpha, blue, green, and red components of the pixel.

Display buffer 114 can be any graphical image buffer used in graphical image processing. For example, display buffer 114 can be a Z buffer which is used in a conventional manner to remove hidden surfaces from a rendered graphical image. Alternatively, display buffer 114 can be a frame buffer whose contents are immediately displayed in one of computer display devices 120. Each of computer display devices 120 can be any type of computer display device including without limitation a printer, a cathode ray tube (CRT), a light-emitting diode (LED) display, or a liquid crystal display (LCD). Each of computer display devices 120 receives from processor 102 control signals and data and, in response to such control signals, displays the received data. Computer display devices 120, and the control thereof by processor 102, are conventional.

The display format is a format of the data which is suitable for receipt and display of the data by one or more of computer display devices 120. In one embodiment, the display format includes an eight-bit unsigned integer to represent each band of each pixel. For example, if the graphical image represented by display buffer 114 is a single-band greyscale graphical image, each pixel of the graphical image is represented by a single eight-bit unsigned integer. Similarly, if the graphical image represented by display buffer 114 is a four-band color graphical image whose bands are alpha, blue, green, and red, each pixel of the graphical image is represented by four contiguous eight-bit unsigned integers which represent alpha, blue, green, and red components of the pixel.

Figure 2:
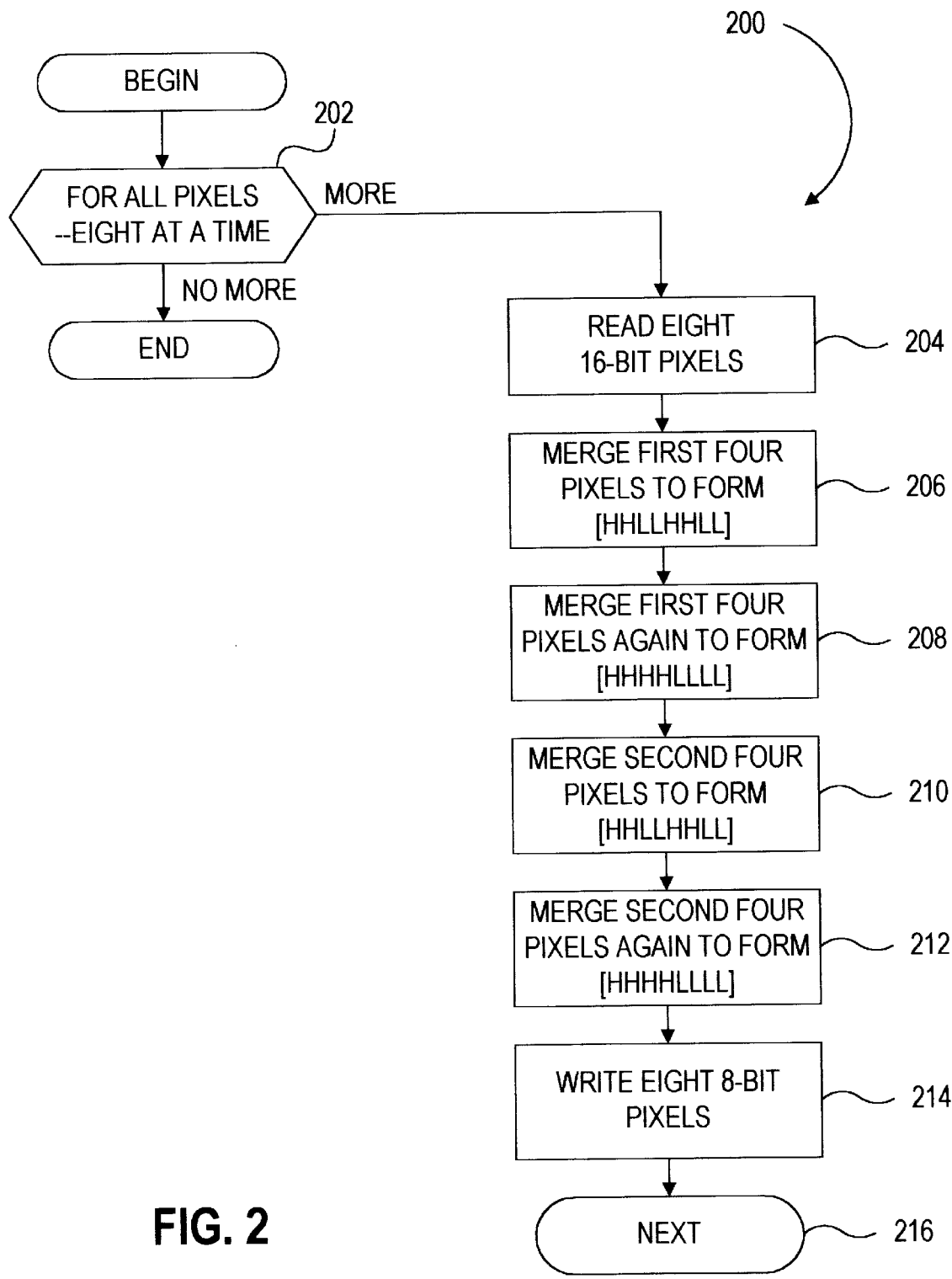
FIG. 2 is a logic flow diagram illustrating the recasting of graphical image data by the image processor of FIG. 1 in accordance with the present invention.

The recasting of pixels from the processing format in processing buffer 112 to the display format in display buffer 114 by image processor 110 is illustrated as logic flow diagram 200 (FIG. 2). Processing according to logic flow diagram 200 begins with loop step 202. Loop step 202 and next step 216 define a loop in which image processor 110 (FIG. 1) processes each band of each pixel of processing buffer 112 according to steps 204–214. Eight pixel components represented in processing buffer 112 are processed in a single iteration of the loop defined by loop step 202 and next step 216. For example, if the graphical image represented in processing buffer 112 is a single-band greyscale graphical image, eight pixels are processed in a single iteration of the loop defined by loop step 202 and next step 216. On the other hand, if the graphical image represented in processing buffer 112 is a four-band color graphical image, eight pixel components which collective represent two pixels are processed in a single iteration of the loop defined by loop step 202 and next step 216. Eight components are processed in each iteration of the loop defined by steps 202 and 216 in this illustrative embodiment because the largest single write operation which can be performed by processor 102 (FIG. 1) can write eight components in the display format to display buffer 114 at once. For each eight of the components of the pixels of processing buffer 112, processing transfers from loop step 202 to step 204.

In step 204, image processor 110 (FIG. 1) reads eight pixel components in the processing format from processing buffer 112. Processor 102 performs a read operation in which sixteen contiguous bytes of data can be read from memory 104. Image processor 110 invokes the read operation and causes processor 102 to perform a data alignment operation which shifts the read data such that the byte representing the first of the eight pixel components of processing buffer 112 to be processed according to the current iteration of the loop defined by loop step 202 (FIG. 2) and next step 216 is aligned on an eight-byte boundary. The first eight bytes of the aligned data represent four pixel components in the processing format, e.g., four pixel components represented by sixteen-bit unsigned integers. The second four pixel components processed in the current iteration of the loop defined by steps 202 and 216 are read from processing buffer 112 in a second read operation and a second, corresponding data alignment operation.

In a preferred embodiment, image processor 110 (FIG. 1) determines whether the first sixteen bytes of data read in step 204 (FIG. 2) are already aligned on an eight-byte boundary prior performing the data alignment operation. If the sixteen bytes of data are already so aligned, image processor 110 (FIG. 1) does not perform the data alignment operation and the data read in a single read operation represents all eight pixel components.

While data representing eight pixel components in the processing format are retrieved substantially simultaneously, data representing four pixel components are converted from the processing format to the display format substantially simultaneously. Thus, eight contiguous bytes representing the first four pixel components read from processing buffer 112 are stored in data double word 302 (FIG. 3) of image processor 110 (FIG. 1). Data double word 302 (FIG. 3) includes eight partitioned bytes H0, L0, H1, L1, H2, L2, H3, and L3. Bytes H0 and L0 represent most significant and least significant bytes of the first pixel component. Similarly, bytes H1 and L1 represent most significant and least significant bytes of the second pixel component; bytes F12 and L2 represent most significant and least significant bytes of the third pixel component; and bytes H3 and L3 represent most significant and least significant bytes of the fourth pixel component. In data double word 302, each of the four pixel components are processed such that the least significant byte of each pixel component in the processing format is equivalent to the same pixel component in the display format. In one embodiment, processing of pixel components while stored in processing buffer 112 (FIG. 1) scales the pixel components such that the least significant portion of each pixel component represents the pixel component in the display format. Since processing of pixel components typically involves scaling pixel components, the scale factor can be adjusted such that the result of such processing is a pixel component whose significant portion accurately represents the pixel component in the display format. In this illustrative embodiment, pixel components are processed in the processing format of sixteen-bit unsigned integers but are scaled during processing to have a value in the range of zero to 255 which is represented by the least significant eight bits of the pixel component. As a result, the most significant portion of the pixel component in processing format, e.g., the eight most significant bits in this illustrative embodiment, are zero.

In an alternative embodiment, partitioned arithmetic operations are performed by processor 102 (FIG. 1) on data double word 302 (FIG. 3) to scale each of the four pixel components represented in data double word 302 substantially simultaneously such that the least significant portion of each of the pixel components represents the pixel component in the display format. Such partitioned operations are described more completely, for example, in (i) U.S. patent application Ser. No. 08/236,572 by Timothy J. Van Hook, Leslie Dean Kohn, and Robert Yung, filed Apr. 29, 1994 and entitled "A Central Processing Unit with Integrated Graphics Functions" (the '572 application) and (ii) U.S. patent application Ser. No. 08/398,111 by Chang-Guo Zhou and Daniel S. Rice, filed Mar. 3, 1995 and entitled "Color Format Conversion in a Parallel Processor"(the '111 application), both of which are incorporated in their entirety herein by reference.

In step 204 (FIG. 2), image processor 110 (FIG. 1) stores the second four pixel components in a data double word 312 (FIG. 3) in a directly analogous manner to that described above with respect to data double word 302. Processing transfers from step 204 (FIG. 2) to step 206.

Figure 3:
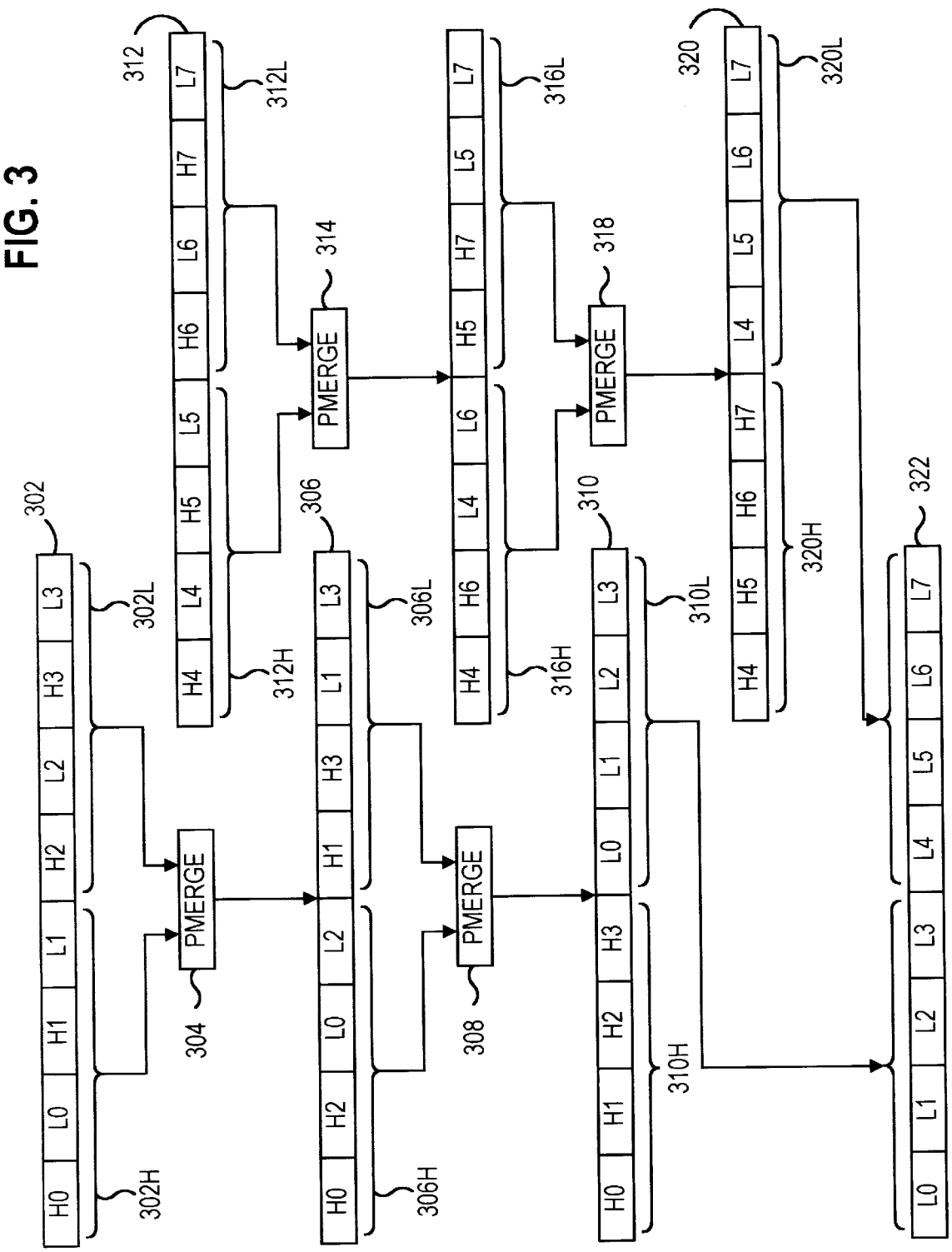
FIG. 3 is a block diagram illustrating merge operations used by the image processor of FIG. 1 to recast graphical image data in accordance with the present invention.
Figure 4:
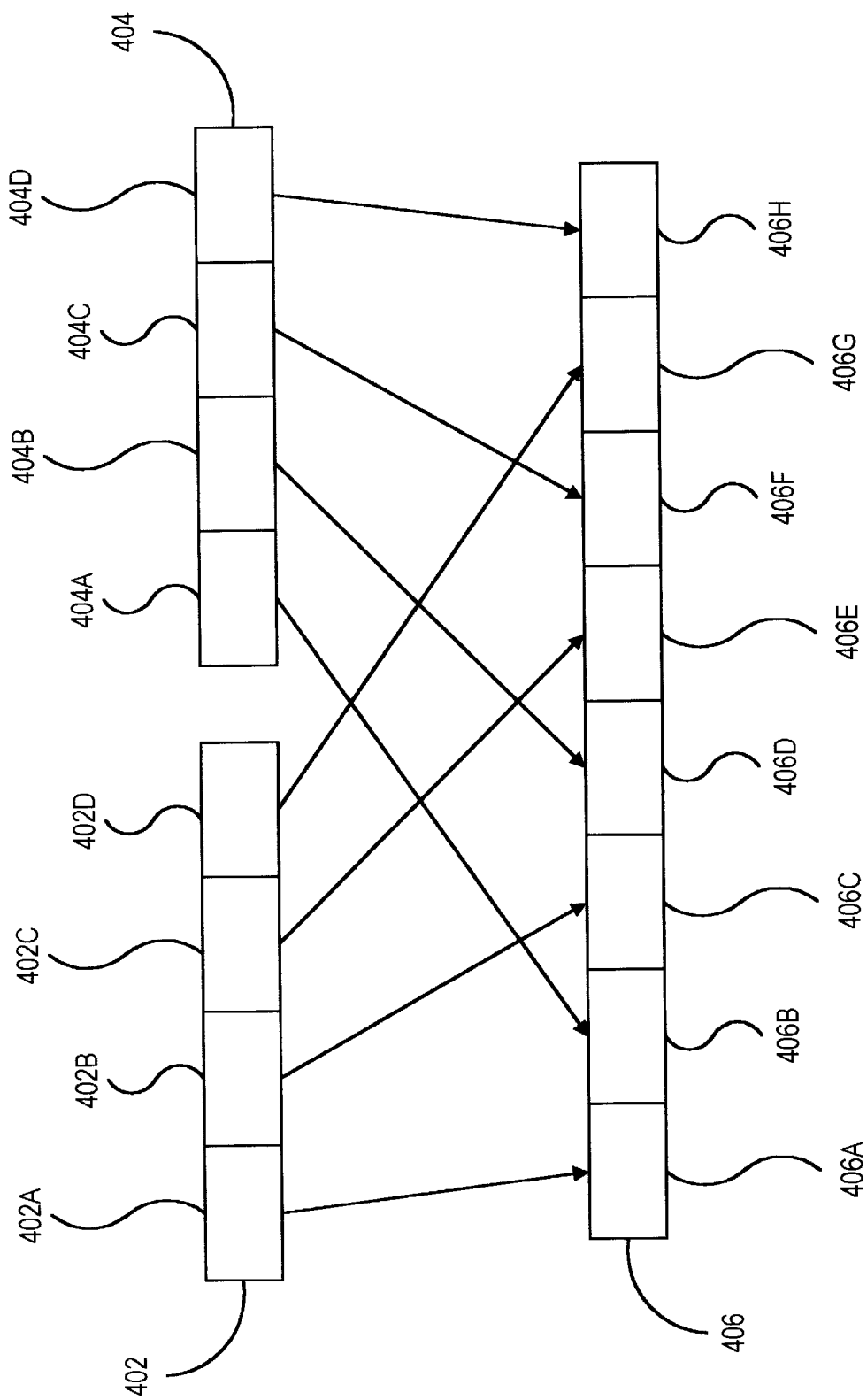
FIG. 4 is a block diagram illustrating a merge operation performed by a computer processor of FIG. 1.

In step 206, image processor 110 (FIG. 1) merges bytes H0 FIG. 3), L0, H1, and L1 with bytes H2, L2, H3, and L3 using a PMERGE operation 306 which is performed by processor 102 (FIG. 1) and is illustrated in FIG. 4. Data word 402 is 32-bits in length and includes four partitioned bytes 402A–D. Similarly, data word 404 is 32-bits in length and includes four partitioned bytes 404A–D. The PMERGE operation interleaves respective bytes of data words 402 and 404 into a double data word 406 as shown. Double data word 406 is 64 bits in length and includes eight partitioned bytes 406A–H. The result of PMERGE operation 304 (FIG. 3) is data double word 306 which is 64-bits in length and whose eight partitioned bytes have the following values: H0, H2, L0, L2, H1, H3, L1, and L3. Processing transfers from step 206 (FIG. 2) to step 208.

In step 208, image processor 110 (FIG. 1) merges upper four bytes 306H (FIG. 3) of data double word 306 and lower four bytes 306L of data double word 306 using a PMERGE operation 308, which is directly analogous to PMERGE operation 304 described above. The result of PMERGE operation 308 is double data word 310 which is 64-bits in length and whose eight partitioned bytes have the following values: H0, H1, H2, H3, L0, L1, L2, and L3. Processing transfers from step 208 (FIG. 2) to step 210.

In step 210, image processor 110 (FIG. 1) merges the second four pixel components stored in data double word 312 using a PMERGE operation 314 in a directly analogous manner to that described above with respect to step 206 FIG. 2) to produce data double word 316 whose eight partitioned bytes are H4 (FIG. 3), H6, L4, L6, H5, H7, L5, and L7. Processing transfers to step 212 (FIG. 2) in which image processor 110 (FIG. 1) merges upper four bytes 316H (FIG. 3) and lower four bytes 316L of data double word 316 representing the second four pixel components in a directly analogous manner to that described above with respect to step 208 (FIG. 2). The result of PMERGE operation 318 (FIG. 3) is double data word 320 which is 64-bits in length and whose eight partitioned bytes have the following values: H5, H6, H6, H7, LA, L5, L6, and L7.

As described above, the least significant byte of each of the pixel components in the processing format accurately represents the pixel component in the display format. Since bytes L0, L1, L2, and L3 are the least significant bytes of the first four pixel components retrieved in step 204 (FIG. 2), bytes L0 (FIG. 3), L1, L2, and L3 accurately represent the first four pixel components in the display format. Similarly, bytes L4, L5, L6, and L7 are the least significant bytes of the second four pixel components retrieved in step 204 FIG. 2) and therefore accurately represent the second four pixel components in the display format. In step 214, image processor 110 (FIG. 1) writes to display buffer 114 lower four bytes 310L (FIG. 3) of data double word 310 and lower four bytes 320L of data double word 320, which collectively form data double word 322 whose eight partitioned bytes have the values L0, L1, L2, L3, L4, L5, L6, and L7. In one embodiment, image processor 110 (FIG. 1) combines lower four bytes 310L (FIG. 3) of data double word 310 and lower four bytes 320L of data double word 320 to form data double word 322 prior to writing data double word 322 in a single computer prior to writing data double word 322 to display buffer 114 (FIG. 1).

Thus, eight pixel components are converted from a processing format to a display format using only two read operations and a single write operation. In addition, four pixel components are converted from the processing format to the display format in only two PMERGE operations. Accordingly, converting one million four-band color pixels in processing format in processing buffer 112 to display format in display buffer 114 using only one million read operations, 500,000 write operations, and 500,000 PMERGE operations. By contrast, conventional conversion techniques typically require four million read operations, four million write operations, and at least four million operations to convert each pixel component. Therefore, the present invention represents a significant improvement over conventional graphical image format conversion techniques.

As described above, storage of pixels in display buffer 114 can result immediately or indirectly in display of such pixels in one or more of computer display devices 120. From step 214 (FIG. 2), processing transfers through next step 216 to loop step 202 in which the next eight pixel components stored in processing buffer 112 are processed according to steps 204–214. Once all pixel components stored in processing buffer 112 have been processed according to the loop of loop step 202 and next step 216, processing according to logic flow diagram 200 completes.

While it is generally described that all pixel components stored in processing buffer 112 (FIG. 1) are processed, eight pixels per iteration of the loop of loop step 202 (FIG. 2) and next step 216, some buffers do not necessarily store pixels of sequential scanlines contiguously. Therefore, in a preferred embodiment, image processor 110 (FIG. 1) processes in each iteration of the loop of loop step 202 (FIG. 2) and next step 216 eight pixel components of a particular scanline stored within processing buffer 112 (FIG. 1). In this preferred embodiment, image processor 110 processes each scanline of processing buffer 112 in sequence.

It is appreciated that scanlines of a particular graphical image represented by processing buffer 112 sometimes has a number of pixel components which is not evenly divisible by eight. In such circumstances, image processor 110 processes one, two, three, four, five, six, or seven pixel components stored within processing buffer 112 in the manner described above with respect to steps 204–214 (FIG. 2) while ignoring excess bytes of data double words 302 (FIG. 3), 306, 310, 312, 316, 320, and 322. For example, if scanlines of a graphical image represented within processing buffer 112 include a number of pixel components which is one more than an integer multiple of eight, one pixel component stored within processing buffer 112 is processed in the following manner.

Image processor 110 reads one pixel component from processing buffer 112 and stores the read pixel component as bytes H0 and L0 in data double word 302 (FIG. 3). Bytes H1, L1, H2, L2, H3, L3, H4, L4, H5, L5, H6, L6, H7, and L7 are ignored. PMERGE operations 304 and 308 are executed in the manner described above. As a result, byte L0 is the most significant byte of data double word 322 and is stored in display buffer 114 (FIG. 1) by image processor 110. Bytes L2–7 (FIG. 3) are data double word 322 are ignored.

Processor 102

Figure 5:
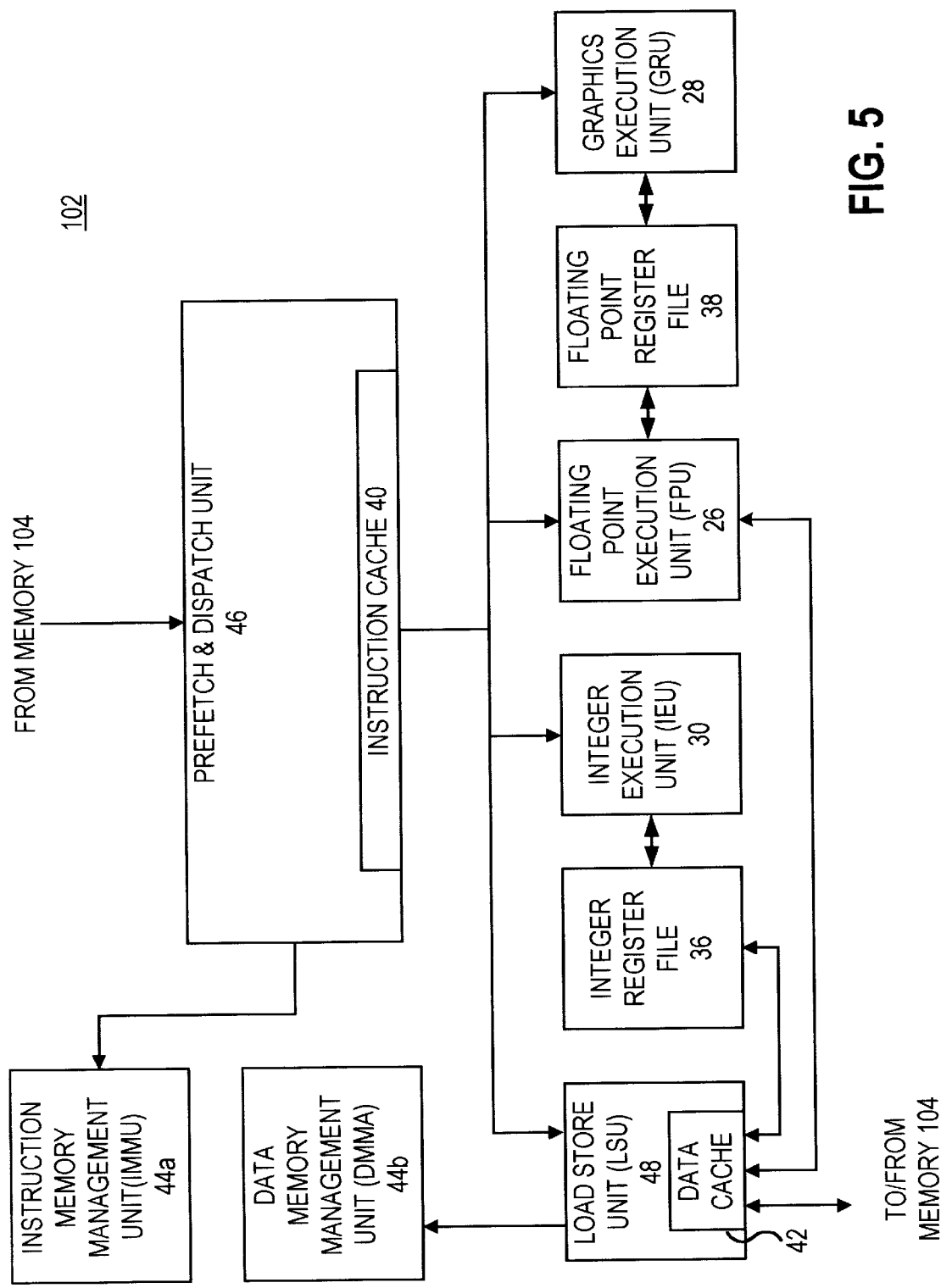
FIG. 5 is a block diagram of the computer processor of FIG. 1 in greater detail.

Processor 102 is shown in greater detail in FIG. 5 and is described briefly herein and more completely in the '572 application. Processor 102 includes a prefetch and dispatch unit (PDU) 46, an instruction cache 40, an integer execution unit (IEU) 30, an integer register file 36, a floating point unit (FPU) 26, a floating point register file 38, and a graphics execution unit (GRU) 28, coupled to each other as shown. Additionally, processor 102 includes two memory management units (IMNU & DMMU) 44a–44b, and a load and store unit (LSU) 48, which in turn includes data cache 120, coupled to each other and the previously described elements as shown. Together, the components of processor 102 fetch, dispatch, execute, and save execution results of computer instructions, e.g., computer instructions of image processor 110 (FIG. 1), in a pipelined manner.

PDU 46 (FIG. 5) fetches instructions from memory 104 (FIG. 1) and dispatches the instructions to IEU 30 (FIG. 5), FPU 26, GRU 28, and LSU 48 accordingly. Prefetched instructions are stored in instruction cache 40. IEU 30, FPU 26, and GRU 28 perform integer, floating point, and graphics operations, respectively. In general, the integer operands and results are stored in integer register file 36, whereas the floating point and graphics operands and results are stored in floating point register file 38. Additionally, IEU 30 also performs a number of graphics operations, and appends address space identifiers (ASI) to addresses of load/store instructions for LSU 48, identifying the address spaces being accessed. LSU 48 generates addresses for all load and store operations. The LSU 48 also supports a number of load and store operations, specifically designed for graphics data. Memory references are made in virtual addresses. MMUs 44a–44b map virtual addresses to physical addresses.

PDU 46, IEU 30, FPU 26, integer and floating point register files 36 and 38, Ms 44a–44b, and LSU 48 can be coupled to one another in any of a number of configurations as described more completely in the '572 application. As described more completely in the '572 application with respect to FIGS. 8a–8d thereof, GRU 28 performs a number of distinct partitioned multiplication operations and partitioned addition operations. Various partitioned operations used by image processor 110 FIG. 1) are described more completely below.

As described above, processor 102 includes four (4) separate processing units, i.e., LSU 48, IEU 30, FPU 26, and GRU 28. Each of these processing units is described more completely in the '572 application. These processing units operate in parallel and can each execute a respective computer instruction while others of the processing units executes a different computer instruction. GRU 28 executes the PMERGE operations described above.

In one embodiment, processor 102 is the UltraSPARC processor and computer system 100 (FIG. 1) is the UltraSPARCstation, both of which are available from Sun Microsystems, Inc. of Mountain View, Calif. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

The above description is illustrative only and is not limiting. The present invention is limited only by the claims which follow.

What is claimed is:

1. A method for converting a first data word which includes at least four data components, each of which has a first portion and a second portion, in a first data format to a second data word which includes the at least four data components in a second data format, the method comprising:

interleaving (i) a first portion of the first data word which includes a first one of the at least four data components and (ii) a second portion of the first data word which includes a second one of the at least four data components to form an interleaved data word which includes the first portion of the first data component which is adjacent to the first portion of the second data component and the second portion of the first data component which is adjacent to the second portion of the second data component, wherein the first portions of the first and second data components represent the first and second data components in the second data format; and including the first portions of the first and second data components from the interleaved data word in the second data word;

wherein the first portion of the first data word further includes a third one of the at least four data components;

(a) further wherein the second portion of the first data word further includes a fourth one of the at least four data components;

(b) further wherein the interleaved data word further includes the first portion of the third data component and the first portion of the fourth data component, the first portions of the third and fourth data components being adjacent to one another within the interleaved word;

(c) further wherein the first portions of the third and fourth data components represent the third and fourth data components in the second data format;

(d) further wherein the method further comprises:
(i) interleaving a first portion of the interleaved word with a second portion of the interleaved word to form a second interleaved word in which the first portions of the first, second, third, and fourth data components are substantially contiguous; and (e) further wherein the step of including further comprises:
(i) including the first portions of the third and fourth data components in the second data word.

2. A computer program product which includes a computer usable medium having computable readable code embodied therein for converting a first data word which includes at least four data components, each of which has a first portion and a second portion, in a first data format to a second data word which includes the at least four data components in a second data format the computer readable code comprising:

a merge module configured to interleave (i) a first portion of the first data word which includes a first one of the at least four data components and (ii) a second portion of the first data word which includes a second one of the at least four data components to form an interleaved data word which includes the first portion of the first data component adjacent to the first portion of the second data component and the second portion of the first data component which is adjacent to the second portion of the second data component, wherein the first portions of the first and second data components represent the first and second data components in the second data format; and a data selection module operatively coupled to the merge module and configured to include the first portions of the first and second data components from the interleaved data word in the second data word;

wherein the first portion of the first data word further includes a third one of the at least four data components;

(a) further wherein the second portion of the first data word further includes a fourth one of the at least four data components;

(b) further wherein the interleaved data word further includes the first portion of the third data component and the first portion of the fourth data component, the first portions of the third and fourth data components being adjacent to one another within the interleaved word;

(c) further wherein the first portions of the third and fourth data components represent the third and fourth data components in the second data format;

(d) further wherein the computer readable code further comprises:
(i) a second merge module different from the first-mentioned merge module, operatively coupled to the first merge module and the data selection module, and configured to interleave a first portion of the interleaved word with a second portion of the interleaved word to form a second interleaved word in which the first portions of the first, second, third, and fourth data components are substantially contiguous; and (e) further wherein the data selection module is further configured to include the first portions of the third and fourth data components in the second data word.

3. A data recaster for converting a first data word which includes at least four data components, each of which has a first portion and a second portion, in a first data format to a second data word which includes the at least four data components in a second data format, the data recaster comprising:

a merge module configured to interleave (i) a first portion of the first data word which includes a first one of the at least four data components and (ii) a second portion of the first data word which includes a second one of the at least four data components to form an interleaved data word which includes the first portion of the first data component adjacent to the first portion of the second data component and the second portion of the first data component which is adjacent to the second portion of the second data component, wherein the first portions of the first and second data components represent the first and second data components in the second data format, and a data selection module operatively coupled to the merge module and configured to include the first portions of the first and second data components from the interleaved data word in the second data word;

wherein the first portion of the first data word further includes a third one of the at least four data components;

(a) further wherein the second portion of the first data word further includes a fourth one of the at least four data components;

(b) further wherein the interleaved data word further includes the first portion of the third data component and the first portion of the fourth data component, the first portions of the third and fourth data components being adjacent to one another within the interleaved word;

(c) further wherein the first portions of the third and fourth data components represent the third and fourth data components in the second data format;

(d) further wherein the data recaster further comprises:
(i) a second merge module different from the first-mentioned merge module, operatively coupled to the first merge module and the data selection module, and configured to interleave a first portion of the interleaved word with a second portion of the interleaved word to form a second interleaved word in which the first portions of the first, second, third, and fourth data components are substantially contiguous; and (e) further wherein the data selection module is further configured to include the first portions of the third and fourth data components in the second data word.

4. A computer system comprising:

a memory;

a computer processor operatively coupled to the memory; and a data recaster stored in the memory and which includes at least one computer instructions which are executed within the computer processor to convert a first data word which includes at least four data components, each of which has a first portion and a second portion, in a first data format to a second data word which includes the at least four data components in a second data format, the data recaster comprising:

a merge module configured to interleave (i) a first portion of the first data word which includes a first one of the at least four data components and (ii) a second portion of the first data word which includes a second one of the at least four data components to form an interleaved data word which includes the first portion of the first data component adjacent to the first portion of the second data component and the second portion of the first data component which is adjacent to the second portion of the second data component, wherein the first portions of the first and second data components represent the first and second data components in the second data format; and a data selection module operatively coupled to the merge module and configured to include the first portions of the first and second data components from the interleaved data word in the second data word;

wherein the first portion of the first data word further includes a third one of the at least four data components;

(a) further wherein the second portion of the first data word further includes a fourth one of the at least four data components;

(b) further wherein the interleaved data word further includes the first portion of the third data component and the first portion of the fourth data component, the first portions of the third and fourth data components being adjacent to one another within the interleaved word;

(c) further wherein the first portions of the third and fourth data components represent the third and fourth data components in the second data format;

(d) further wherein the data recaster further comprises:

(i) a second merge module different from the first-mentioned merge module, operatively coupled to the first merge module and the data selection module, and configured to interleave a first portion of the interleaved word with a second portion of the interleaved word to form a second interleaved word in which the first portions of the first, second, third, and fourth data components are substantially contiguous; and (e) further wherein the data selection module is further configured to include the first portions of the third and fourth data components in the second data word.

5. A system for distributing code (i) which is stored on a computer-readable medium, (ii) which is executable by a computer, and (iii) which includes at least one module, each of which in turn is configured to carry out at least one function to be executed by the computer, the at least one function including converting a first data word which includes at least four data components, each of which has a first portion and a second portion, in a first data format to a second data word which includes the at least four data components in a second data format, the system comprising:

a merge module configured to interleave (i) a first portion of the first data word which includes a first one of the at least four data components and (ii) a second portion of the first data word which includes a second one of the at least four data components to form an interleaved data word which includes the first portion of the first data component adjacent to the first portion of the second data component and the second portion of the first data component which is adjacent to the second portion of the second data component, wherein the first portions of the first and second data components represent the first and second data components in the second data format; and a data selection module operatively coupled to the merge module and configured to include the first portions of the first and second data components from the interleaved data word in the second data word;

wherein the first portion of the first data word further includes a third one of the at least four data components;

(a) further wherein the second portion of the first data word further includes a fourth one of the at least four data components;

(b) further wherein the interleaved data word further includes the first portion of the third data component and the first portion of the fourth data component, the first portions of the third and fourth data components being adjacent to one another within the interleaved word;

(c) further wherein the first portions of the third and fourth data components represent the third and fourth data components in the second data format;

(d) further wherein the data recaster further comprises:

(i) a second merge module different from the first-mentioned merge module, operatively coupled to the first merge module and the data selection module, and configured to interleave a first portion of the interleaved word with a second portion of the interleaved word to form a second interleaved word in which the first portions of the first, second, third, and fourth data components are substantially contiguous; and (e) further wherein the data selection module is further configured to include the first portions of the third and fourth data components in the second data word.

* * * * *